US012686316B2

(12) United States Patent　　　(10) Patent No.: US 12,686,316 B2
Anand et al.　　　(45) Date of Patent: Jul. 21, 2026

(54) SMART TEMPERATURE-CONTROLLED BEVERAGE CUPHOLDER

(71) Applicant: GM GLOBAL TECHNOLOGY OPERATIONS LLC, Detroit, MI (US)

(72) Inventors: Alok Anand, Troy, MI (US); Kevin W. Owens, Sterling Heights, MI (US); Cleavon Allen Tomlinson, Southfield, MI (US); Bilal Sakbani, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/422,800

(22) Filed: Jan. 25, 2024

(65) Prior Publication Data

US 2025/0242739 A1　　Jul. 31, 2025

(51) Int. Cl.
　　*B60N 3/10*　　(2006.01)
　　*F25D 31/00*　　(2006.01)
(52) U.S. Cl.
　　CPC ............ *B60N 3/104* (2013.01); *F25D 31/007* (2013.01); *F25D 2331/805* (2013.01); *F25D 2331/809* (2013.01); *F25D 2700/06* (2013.01)
(58) Field of Classification Search
　　CPC . B60N 3/104; F25D 31/007; F25D 2331/805; F25D 2331/809; F25D 2700/06
　　See application file for complete search history.

(56) References Cited

U.S. PATENT DOCUMENTS

| | | | |
|---|---|---|---|
| 2016/0023585 A1* | 1/2016 | Salter | B60N 3/104 |
| | | | 165/202 |
| 2020/0047654 A1* | 2/2020 | Pine | B60R 25/01 |
| 2020/0180490 A1* | 6/2020 | Benliyan | B60R 11/00 |
| 2023/0169772 A1* | 6/2023 | Naparstek | H04N 23/698 |
| | | | 348/36 |

FOREIGN PATENT DOCUMENTS

| | | |
|---|---|---|
| DE | 102015112074 A1 | 1/2016 |
| DE | 102018128710 B3 | 3/2020 |
| DE | 102022125658 A1 | 4/2024 |

\* cited by examiner

*Primary Examiner* — Joseph F Trpisovsky
(74) *Attorney, Agent, or Firm* — Ingrassia Fisher & Lorenz, LLP | IF&L

(57)　　　　　ABSTRACT

A cupholder temperature control system including a pressure sensor for detecting an object within a cupholder, a temperature sensor for detecting a current object temperature of the object, an optical sensor for capturing an image of the object, a processor to perform an image recognition algorithm to detect at least one of a logo, a bar code and a quick response code on the object, to determine the object is a beverage container in response to a detection of the at least one of the logo, the bar code and the quick response code, to generate a control signal in response to the current object temperature differing from an ambient temperature by a threshold amount and the object being a beverage container, and a heat transfer system configured to maintain the current object temperature of the object in response to the control signal.

20 Claims, 3 Drawing Sheets

<u>100</u>

100

200

SMART TEMPERATURE-CONTROLLED BEVERAGE CUPHOLDER

INTRODUCTION

The present disclosure relates generally to a system for heating or cooling a beverage container. More specifically, aspects of the present disclosure relate to systems, methods and devices for detecting an object within a cupholder, determining if the object is a beverage container, determining an initial temperature of a beverage container, sensing and confirming one or more characteristics of the beverage container, and heating or cooling the beverage container accordingly.

Customers have increasingly shown preferences for added convenience features in vehicles they are considering purchasing, including and increased customer demand for cupholders. These preferences can be influenced by changing lifestyle habits, the proliferation in drive-through restaurants and an increased focus on entertainment and personal comfort. Naturally, as modern vehicles already include heating and cooling systems, it would be desirable to harness these systems to heat or cool beverages placed in a vehicle cupholder.

Traditionally, many problems arise in providing a temperature controlled cupholder. These problems can result due to the wide variety of object that are typically placed within cupholders, such as keys and sunglasses, wide varieties of beverage containers and the wide variety of beverages within those containers. Traditionally, vehicle occupants would be required to select either a heating or cooling option and a heating or cooling temperature. When a vehicle occupant is on the go, these options may not be regularly selected rendering the heating or cooling system superfluous. Accordingly, it is desirable to address the aforementioned problems and to provide systems and methods for providing a smart temperature-controlled beverage cupholder. Furthermore, other desirable features and characteristics of the present disclosure will become apparent from the subsequent detailed description and the appended claims, taken in conjunction with the accompanying drawings and the foregoing technical field and background.

The above information disclosed in this background section is only for enhancement of understanding of the background of the invention and therefore it may contain information that does not form the prior art that is already known in this country to a person of ordinary skill in the art.

SUMMARY

Disclosed herein are vehicle system cooling methods and systems and related control logic for provisioning vehicle heating and cooling systems, methods for making and methods for operating such heating and cooling systems, and motor vehicles equipped with onboard heating and cooling systems. By way of example, and not limitation, there are presented various embodiments of systems for providing a smart temperature-controlled beverage cupholder in a motor vehicle disclosed herein.

In accordance with an aspect of the present disclosure, a cupholder temperature control system including a sensor for detecting an object within a cupholder, a temperature sensor for detecting a current object temperature of the object, a processor in operable communication with the sensor and the temperature sensor and configured to generate a control signal in response to the current object temperature and a detection of the object within the cupholder, and a heat transfer system in operable communication with the processor and configured to maintain the current object temperature of the object in response to the control signal.

In accordance with another aspect of the present disclosure wherein the cupholder temperature control system further includes an optical sensor for capturing an image of the cupholder and wherein the object is determined to be a beverage container in response to the image and an image processing algorithm.

In accordance with another aspect of the present disclosure wherein the cupholder temperature control system further includes an optical sensor for capturing an image of the cupholder and wherein the object is determined to be a beverage container in response to at least one of a logo, a bar code or a quick response code captured in the image.

In accordance with another aspect of the present disclosure wherein the temperature sensor is at least one of an infrared sensor and a thermocouple situated within the cupholder.

In accordance with another aspect of the present disclosure wherein the cupholder temperature control system further includes a pressure sensor and wherein the heat transfer system is activated in response an output of the pressure sensor corresponding to a weight of the object exceeding a threshold value.

In accordance with another aspect of the present disclosure wherein the cupholder temperature control system further includes a pressure sensor situated within the cupholder and wherein a presence of the object is determined in response to a change in pressure detected by the pressure sensor.

In accordance with another aspect of the present disclosure wherein an initial temperature setting of the heat transfer system is determined in response to the current object temperature.

In accordance with another aspect of the present disclosure wherein an initial temperature setting of the heat transfer system is determined in response to a prior user defined temperature associated with the object.

In accordance with another aspect of the present disclosure wherein the heat transfer system is activated in response to the current object temperature differing from an ambient temperature by a threshold temperature value.

In accordance with another aspect of the present disclosure, a method for controlling a cupholder temperature control system including detecting an object within a cupholder, determining a current temperature of the object, capturing, with an optical sensor, an image of the object, generating a control signal in response to determining the object is a beverage container in response to the image, and activating a heat transfer system within the cupholder in response to the control signal.

In accordance with another aspect of the present disclosure wherein the optical sensor is a camera and wherein a processor performs an image recognition algorithm to determine the object is the beverage container.

In accordance with another aspect of the present disclosure wherein a determination that the object is the beverage container is performed in response to the current temperature of the object exceeding a threshold difference from an ambient temperature within a vehicle cabin.

In accordance with another aspect of the present disclosure wherein a determination that the object is the beverage container is performed in response to the current temperature of the object exceeding a threshold difference from an ambient temperature outside of a vehicle including the cupholder.

In accordance with another aspect of the present disclosure wherein the object is detected within the cupholder in response to a change in an output value of a pressure sensor situated within the cupholder.

In accordance with another aspect of the present disclosure including generating a user interface in response to generating the control signal, receiving a user input corresponding to a temperature and controlling the heat transfer system in response to the temperature.

In accordance with another aspect of the present disclosure including generating a user interface in response to generating the control signal, receiving a user input corresponding to a temperature, controlling the heat transfer system in response to the temperature and storing the temperature and an indication of the beverage container in a memory wherein the temperature is used as a default temperature for the heat transfer system in response to a detection of the beverage container within the cupholder.

In accordance with another aspect of the present disclosure wherein the object is determined to be the beverage container in response to at least one of a logo, a bar code, and a quick response code on the beverage container.

In accordance with another aspect of the present disclosure wherein the object is determined to be the beverage container in response to a shape of the beverage container determined in response to the image and a second image of the object captured by a second optical sensor.

In accordance with another aspect of the present disclosure, a cupholder temperature control system including a pressure sensor for detecting an object within a cupholder, a temperature sensor for detecting a current object temperature of the object, an optical sensor for capturing an image of the object, a processor in operable communication with the sensor and the temperature sensor, the processor configured to perform an image recognition algorithm to detect at least one of a logo, a bar code and a quick response code on the object, to determine the object is a beverage container in response to a detection of the at least one of the logo, the bar code and the quick response code, to generate a control signal in response to the current object temperature differing from an ambient temperature by a threshold amount and the object being a beverage container, and a heat transfer system in operable communication with the processor and configured to maintain the current object temperature of the object in response to the control signal.

In accordance with another aspect of the present disclosure wherein the cupholder temperature control system includes an user interface for providing an indication of an activation of the heat transfer system, for receiving a user input indicative of an alternate temperature and wherein the heat transfer system is further configured to operate at the alternate temperature in response to the user input.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
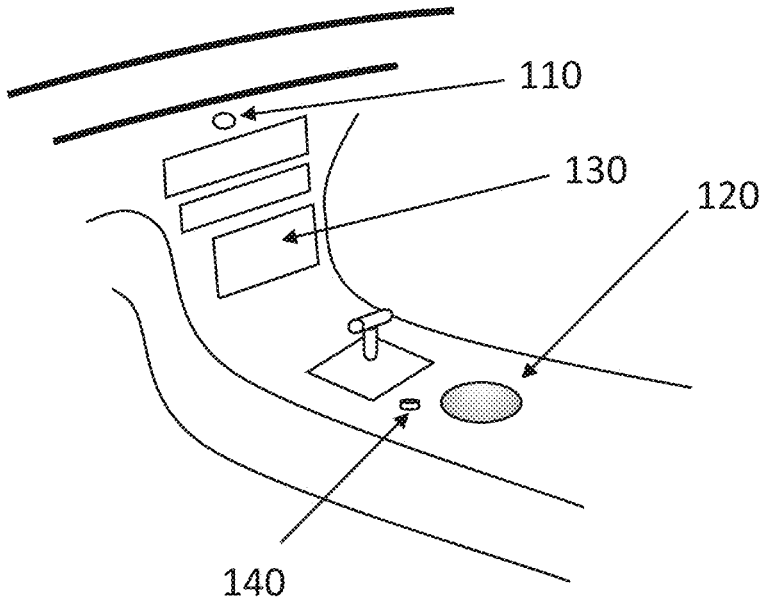
FIG. 1 shows an application for the method and apparatus for a smart temperature controlled beverage cupholder in a motor vehicle according to an exemplary embodiment of the present disclosure.

Turning now to FIG. 1, an exemplary environment 100 for implementing a smart temperature controlled beverage cupholder according to an exemplary embodiment of the present disclosure is shown. The exemplary environment 100 can be a vehicle cabin having an optical sensor 110, a cupholder 120, a display screen 130 and a user input 140.

The illustrated exemplary environment 100 includes a temperature controlled cupholder 120. The temperature controlled cupholder 120 can be used to cool or heat beverage containers situated within the cupholder 120. While temperature controlled cupholders have long been available, prior temperature controlled cupholders required significant user interaction to activate the temperature control unit, select the desired temperature and shut down the temperature controlled cupholder when the vehicle is no longer in use, the beverage container is empty, or the like. Previously, vehicle occupants would be required to activate and adjust the temperature controlled cupholder temperature for each use and for different beverages, making use of the temperature controlled cupholder burdensome. Likewise, the vehicle occupant was also required to deactivate the temperature controlled cupholder if an object other than a beverage, such as keys or sunglasses, were placed into the cupholder. These burdensome requirements often lead to abandonment of the feature for most vehicle occupants.

The exemplary temperature controlled cupholder 120 according to the present disclosure is configured to automatically detect the presence of an object within the cupholder, determine the type of object in the cupholder, determine if the object corresponds to a beverage, determine a current temperature of the beverage, determine a desired temperature for the beverage and correspondingly control the temperature and duty cycle of a heating or cooling circuit to warm or cool the beverage within the cupholder.

In some exemplary embodiment, a processor performing the temperature controlled cupholder algorithm can receive images or other information from the optical sensor 110 having a field of view including the cupholder. The processor can then perform image recognition algorithms on the image to determine the presence of an object and the type of object, such as a cup or sunglasses. The processor can then further detect logos, bar codes, quick read (QR) codes, text information or other information on the object to determine if the object is a beverage, if the beverage should be heated or cooled and a desired temperature of the beverage. In some exemplary embodiments, the optical sensor can include one or more thermal imaging sensors for estimating a temperature of the object in the cupholder or a temperature of the contents of the beverage container.

The temperature controlled cupholder 120 can further include pressure sensors or other optical sensors within the cupholder to determine a size and shape of an object within the cupholder, the weight of the object, and other information. The processor can use this size and weight information to determine if the object is a beverage container and a fill level of the beverage container, such as full or empty. The cupholder may further include a temperature sensor within the cupholder to detect a current temperature of the object within the cupholder. This temperature can be used to estimate a current temperature of the contents of a beverage container within the cupholder and to generate an initial heating or cooling temperature for the temperature controlled cupholder algorithm.

The exemplary environment 100 can further include a display 130 for presenting a graphical user interface to a vehicle occupant. The graphical user interface can include notifications of an activation of the temperature controlled beverage cupholder algorithm, a temperature setting of the temperature control system and/or a current temperature of the object or beverage. In some exemplary embodiments, the display 130 can be a touch sensitive display and can receive user input from the vehicle occupant, such as adjustments to the temperature setting, confirmation to notifications from the temperature controlled beverage cupholder algorithm, deactivation requests from the vehicle occupant, etc. The temperature controlled beverage cupholder algorithm can generate prompts to request additional information or authorization from a vehicle occupant. For example, if an object placed in the cupholder has a current temperature equal to the ambient temperature, the algorithm may prompt the vehicle occupant to confirm activation of the temperature control algorithm and can request a desired temperature, such as colder or hotter.

The user input 140 can be a pushbutton, dial or other device to facilitate a user to enter a command or respond to a prompt. In some exemplary embodiments, the user input 140 can be a dual control switch having a pushbutton and a rotatable dial situated around the pushbutton. The dial can be used to change a selection shown on a graphical user interface on the display screen 130 and the pushbutton can be used to choose that selection. In some exemplary embodiments, the dial can be used to adjust a temperature setting of the temperature controlled cupholder 120 and the pushbutton can be used to select and/or confirm the adjusted temperature setting.

Figure 2:
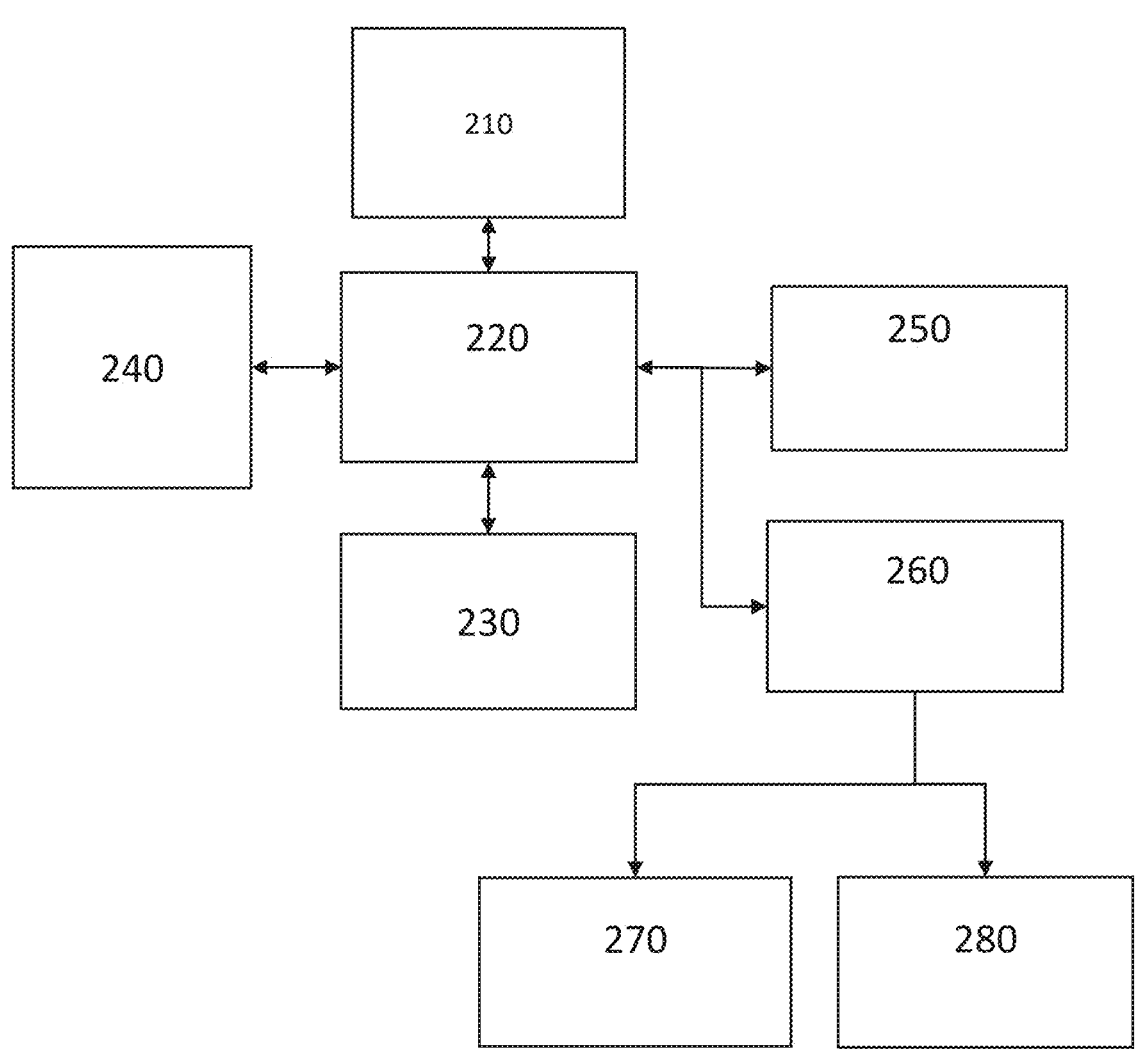
FIG. 2 shows a block diagram of an exemplary system for providing a smart temperature controlled beverage cupholder according to an exemplary embodiment of the present disclosure.

Turning now to FIG. 2, an exemplary system 200 for implementing a smart temperature controlled beverage cupholder according to an exemplary embodiment of the present disclosure is shown. The exemplary system 200 can include an optical sensor 210, a processor 220, a user interface 230, a pressure sensor 240, a temperature sensor 250, a thermal controller 260, a heating circuit 270 and a cooling circuit 280.

The optical sensor 210 is operative to convert light into an electrical signal. When light hits the optical sensor 210, it is absorbed by a material that produces an electrical current. The amount of current produced is proportional to the intensity of the light. Examples of electrical sensors can include photodiodes, phototransistors, charge coupled devices (CCDs), complementary metal-oxide-semiconductor (CMOS) sensors and light detection and ranging (LiDAR) sensors. One or more optical sensors 210 can be employed in the exemplary system 200 in order to detect an object within a vehicle cupholder. The optical sensors 210 can further be used to collect data used identify the type of object in the cupholder. In some exemplary embodiments, the optical sensor 210 can be a camera having a field of view including the location of the cupholder. The camera can capture an image of the field of view and couple this image to the processor 220. The processor 220 can then perform an image processing algorithm and/or image detection algorithm to determine if an object is present in the cupholder and/or to determine a type of object in the cupholder, such as sunglasses or a beverage container. The image captured by the camera can further be used to detect logos, bar codes, quick response (QR) codes, or other identifying information on the object.

The optical sensor 210 can be a light intensity sensor located within the cupholder and can be used in conjunction with an appropriate light source to detect the presence of an object within the cup. A reduction of a magnitude of a light from the light source incident on the optical sensors 210 can be indicative of an object being placed in the cupholder. The optical sensor 210 can then couple, to the processor 220, an electric signal having a voltage, or other parameter, representative of the light intensity. The processor 220 can then determine the presence of the object in response to the electric signal and/or can estimate a size of the object within the cupholder in response to the electric signal. An object which significantly fills the cupholder can be indicative of a cup or other drinking vessel whereas an object which results in a more modest reduction in light reception can be indicative of an object which does not fill the cupholder, such as sunglasses or keys.

In some exemplary embodiments, the cupholder can be configured with one or more pressure sensors 240, such as pressure switches, for detecting an object or a weight of the object within the cupholder. For example, the cupholder can be configured with one or more pressure switches located around a circumference of an upper edge of the cupholder, and/or one or more a pressure switches on the bottom of the cupholder. When a driver inserts a beverage container into the cupholder, each of the pressure switches can be actuated. If the driver inserts an alternate object into the cupholder, such as sunglasses, fewer pressure switches are actuated, indicating the inserted object is not a cylindrical object, and is therefore less likely to be a beverage container. Likewise, the weight of the object can be estimated by a pressure sensor located on a bottom surface of the cupholder. This weight can be used to estimate the type of object and can be used to estimate if a beverage container is full or empty, thereby informing a thermal control algorithm whether there is a need to heat or cool the object.

In some exemplary embodiments, the output values of the pressure sensors 240 can be monitored over time to track beverage consumption. A visual representation of beverage consumption can be presented by a user interface 230, providing users usage statistics logs, which are valuable for users looking to track their beverage consumption. Furthermore, the system can log liquid intake data and integrate it with wellness applications for comprehensive health monitoring. For example, this liquid intake data can be coupled to a smartphone application of integration with other health monitoring data by a wellness application performed by the smartphone or the like.

The exemplary system 200 can further include a user interface 230, such as a display, a light emitting diode, and/or user input, such as a button or touch screen. This user interface 230 can be used to indicate to a vehicle occupant that the temperature controlled beverage cupholder algorithm has been initiated. The user interface 230 can indicate to the occupant the current heating or cooling level of the temperature controlled beverage cupholder and provide a means for the occupant to adjust this temperature using the user input. The user interface 230 can be configured to allow the occupant to initiate or deactivate the algorithm. In some exemplary embodiments, the user interface 230 can provide visual feedback to a user if a beverage is too hot for safe consumption.

The exemplary system can further include a temperature sensor 250 located within the cupholder for detecting a temperature of an object inserted into the cupholder. In some exemplary embodiments, the temperature sensor 250 can be a thermocouple for sensing a heat level coupled from the object to the thermocouple. The thermocouple can then generate an output signal, such as a voltage representative of the heat level, and couple this output signal to the processor 220. In some exemplary embodiments, the temperature sensor 250 can be a thermal imaging camera or infrared sensor for optically detecting infrared light emitted by the object. The temperature sensor can then couple an output value representative of the infrared light intensity to the processor 220 to facilitate the processor 220 in determining the current temperature of the object.

The exemplary system 200 is further configured with a processor 220 for receiving data from the various sensors and the user interface 230 and for controlling the heating and cooling operations of the cupholder. The processor can determine, in response to the various sensors, whether an object has been inserted into the cupholder and whether this object is likely a beverage container. Likewise, the processor 220 can estimate a current temperature of the object or the contents of the object in response to the temperature sensor 250 and determine whether the object should be cooled or heated. Likewise, the processor can determine if the current temperature of the object differs from the ambient temperature with the vehicle cabin by a threshold temperature value, thereby determining if the temperature control algorithm should be initiated or if a prompt should be provided to a vehicle occupant to request initiation or discontinuation of the temperature control algorithm. For example, if a room temperature beverage is placed into the cupholder, the temperature control algorithm may not accurately determine if the beverage should be heated, cooled, or should remain at room temperature. The vehicle occupant can be presented with an appropriate prompt on the user interface 230 to select heating, cooling and/or no action.

In response to the previous determinations, the processor 220 can generate a control signal to activate a heat transfer system including a heating circuit 270 and/or a cooling circuit 280 within the cupholder to heat or cool an object within the cupholder. In some exemplary embodiments, the processor 220 can generate a control signal indicative of the desire temperature and/or temperature control duty cycle and couple this control signal to a thermal controller 250. The thermal controller 260 can then in turn control the heating circuit 270 or cooling circuit 280 within the cupholder.

In some exemplary embodiments, the processor 220 can determine a current temperature of the object in response to the output signal from the temperature sensor 250 and can control the heating circuit 270 and/or the cooling circuit 280 to maintain the current temperature or achieve a desired temperature of the object and/or the object contents. The processor 220 can vary at least one of the magnitude of the electrical power provided and the duty cycle of the electrical power provided to the heating circuit 270 and/or the cooling circuit 280 in order to achieve the desired temperature.

The heating circuit 270 and/or the cooling circuit 280 are responsive to the electrical power and control signals received from the processor 220 and/or the thermal controller 260 and can be used to heat or cool objects within the cupholder, such as beverages. The heating circuit 270 and the cooling circuit 280 can employ thermoelectric coolers, such as Peltier coolers, and heating elements, such as resistive heating elements. The heating circuit 270 can route vehicle coolant to a heat exchanger within the cupholder to transfer heat from the vehicle engine or battery to the cupholder.

Figure 3:
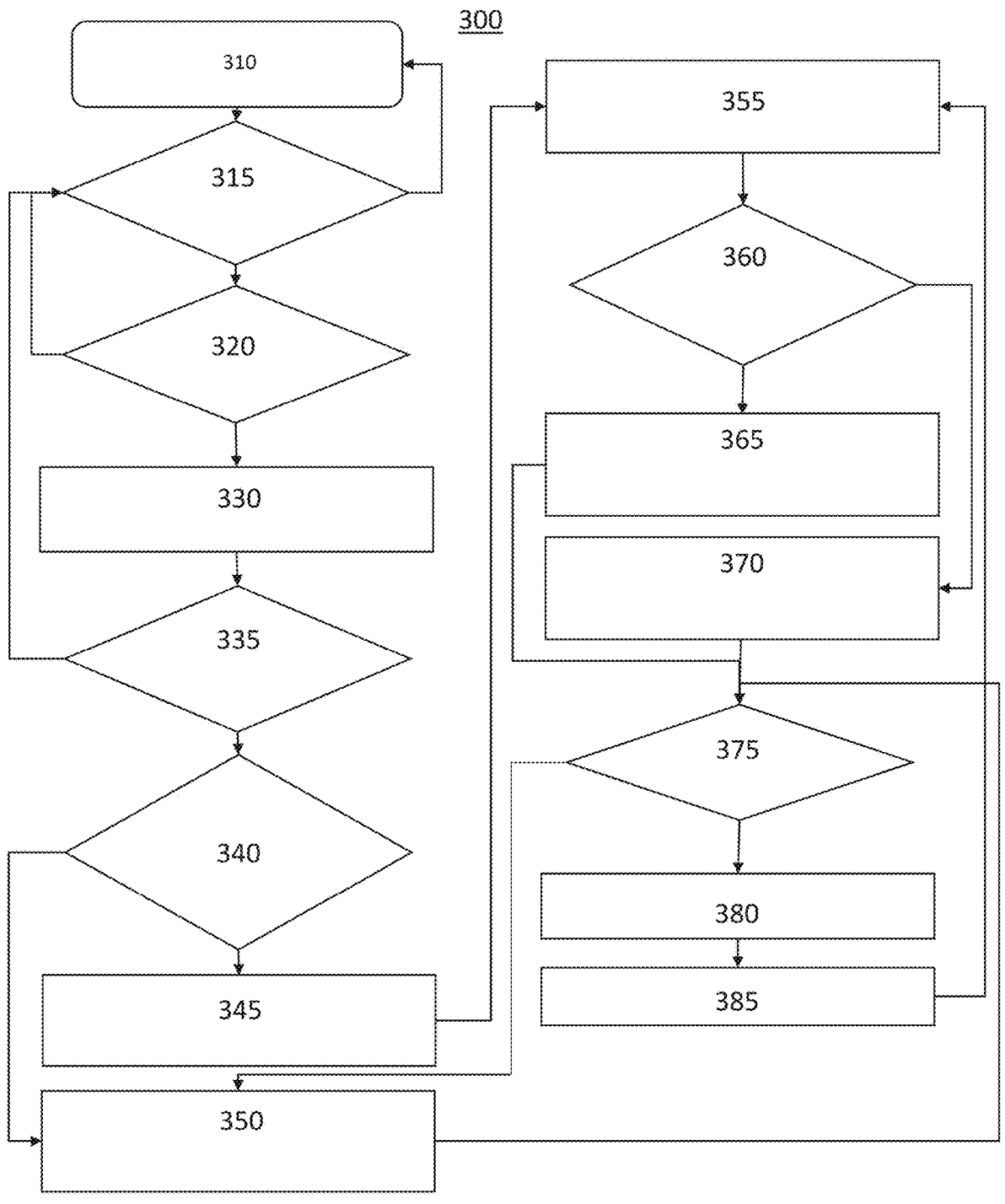
FIG. 3 shows a flow chart illustrating a method for providing a smart temperature controlled beverage cupholder according to an exemplary embodiment of the present disclosure.

Turning now to FIG. 3, a flow chart illustrating an exemplary method 300 for implementing a smart temperature controlled beverage cupholder according to an exemplary embodiment of the present disclosure is shown. In some exemplary embodiments, the method 300 is started 310 when one or more vehicle electronic control systems are initiated. For example, the algorithm performing the method 300 may be initiated as a portion of a startup sequence of an infotainment controller, initiation of an integrated head end or initiation of a central control unit or the like. After the algorithm is started 310, the method can next determine a vehicle propulsion state 315. If the vehicle propulsion state is not in an "on" state, such as being in an off state, a standby state, or start state for an internal combustion vehicle, the method 300 returns to the initial algorithm initiation 310.

If the vehicle propulsion state is in an on position, which can be determined by indicators such as by an ignition key being in the on position or an electrical vehicle propulsion state being in the run position, a vehicle control algorithm being indicative of a vehicle run or on state, the method next determines if an object has been placed in the cupholder 320.

An object can be detected in the cupholder in response to an activation of a pressure switch within the cupholder, such as mounted to a bottom surface or a side surface of the cupholder. Alternatively, the object can be detected using a capacitive sensor, infrared proximity sensor, radio frequency proximity sensor, optical sensor or the like. In some exemplary embodiments, the method 300 can determine the presence of an object within a cupholder using a vehicle cabin camera, such as a vehicle occupant detection and/or eye or head tracking camera. Images can be periodically captured by the camera and compared against previous images or default images of an empty cupholder to determine if an object has been placed in the cupholder. Alternatively, a dedicated camera can be integrated into the infotainment system within the center stack or the like and used to detect the presence of an object within the cupholder.

If an object is not detected 320 within the cupholder, the method can return to a previous state of the algorithm, such as detecting a vehicle propulsion state 315. If an object is detected 320 within the cupholder, the method is next operative to determine a type of object in the cupholder 330. The type of object can be determined using image-based detection systems, sensor based detection systems, or a combination of image and sensor based systems. By employing image based systems, the method 300 can use one or more cameras to capture images of a field of view including the cupholder location. Image recognition algorithms can then be used to analyze the image and data and compare it to a database of known objects to identify the most likely match. In some exemplary embodiments, the image recognition algorithms can detect logos, barcodes, or QR codes to determine the type of object, the contents of an object and/or heating and cooling instructions for the object and/or the contents. For example, the image recognition algorithm can be used to detect a QR code on a side of a cup from a quick service restaurant. The method can then retrieve data related to possible contents of the cup, such as cold drinks or hot drinks, and can retrieve heating or cooling instructions related to the possible contents. Furthermore, the method 300 can optically determine 330 the type of object within the cupholder using multiple cameras having overlapping fields of view and/or one or more depth sensors, such as LiDAR, infrared, or ultrasonic sensors to estimate the object's shape and volume to provide clues about the object's type, such as distinguishing a can from a cup or the like.

After determining the type of object within the cupholder, the method 300 next determines if 335 the object corresponds to a beverage container. The method 300 can make this determination in response to the type of object detected within the cupholder, such as a cup or can. If the method 300 determines that the object does not correspond to a beverage container, the method 300 returns to a prior step in the algorithm, such as determining 315 the vehicle propulsion state. If the method 300 determines 335 that the object does correspond to a beverage container, the method can next the method 300 is next configured to determine 340 a current temperature of the object. The temperature of the object within the cupholder can be determined with a thermal sensor situated within the cupholder. Alternatively, the temperature of the object can be determined using a thermal imaging camera having a field of view including the cupholder location. In some exemplary embodiments, the thermal imaging camera can be used to capture images of the field of view. These images can be used to both detect the presence of an object in the cupholder and a temperature of the object in the cupholder. In some exemplary embodiments, the presence and/or temperature of the object can be determined in response to a temperature differential of the object with respect to an ambient temperature. This detection in response to the temperature differential can be particularly effective when a hot object, such as a hot beverage is brought into a cold vehicle or a cold object is brought into a hot vehicle.

In some exemplary embodiments, after determination 340 of the current temperature of the object within the cupholder, the method 300 is next operative to determine 345 if a temperature threshold between the current temperature of the object and the ambient temperature of the vehicle cabin and/or exterior temperature is exceeded. If the threshold temperature difference 345 is not exceeded, such as +/−5 degrees, the method 300 can next initiate 350 a user interface and request a user input. The method can request a user input, via the user interface, to initiate the warming or cooling function, or may display a predetermined heating or cooling temperature and request 350 a user input to adjust the temperature. For example, if a beverage in the cupholder is determined to be a coffee from a specific coffee shop, which could be determined in response to detection of a QR code on the cup, in response to image recognition of the color and/or logos on the cup, or in response to a beverage container shape, the method 300 can retrieve a temperature value stored in a memory associated with that beverage. In some exemplary embodiments, if the temperature of the object is equal to, or within a threshold difference to, the ambient temperature, there may be no need to heat or cool the object. The method next determines if a temperature adjustment has been received 375 via the user interface.

If the temperature threshold is exceeded 345, the method can next initiate a user interface 355. In some exemplary embodiments, the user interface can be initiated if an object is detected within the cupholder, the temperature of the object exceeds a threshold temperature difference with respect to the ambient temperature and the object is determined to be a beverage container. In some exemplary embodiments, the user interface can be indicative of an initiation of a cooling or warning algorithm for the cupholder. In addition, the user interface can be indicative of a current temperature of the beverage and a temperature setting of the beverage heater or cooler. For example, the user may have previously adjusted a warming temperature to a particular value for a coffee from a particular coffee shop and that value can be saved and associated with the particular beverage.

If a predetermined driver temperature preference for the detected beverage container is available 360, the method 300 can next initiate the heating or cooling function to the predetermined temperature 365. If no predetermined temperature preference is available 360, the method can determine a heating or cooling temperature 370 using a default temperature stored in a memory associated with the detected beverage or beverage type to initiate and perform the beverage heating and cooling algorithm. In some exemplary embodiments, the current temperature of the object can be used as the initial heating or cooling temperature. The method next determines if a temperature adjustment has been received 375 via the user interface.

The method 300 can determine if a temperature adjustment value has been received from the user 375 in response to an input at the user interface. If no input has been received, the method continues to display the user interface requesting a user input 350. If an input has been received, the method 300 is configured to adjust 380 the heating or cooling temperature in response to the user input. In some exemplary embodiments, the method 300 can then store 385 the adjusted temperature as a driver preference associated with the detected beverage. This adjusted temperature can be stored in a memory or the like communicatively coupled with a processor performing the beverage temperature control algorithm. The method 300 then returns to monitoring if a temperature adjustment value has been received from the user 375 in response to an input at the user interface.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cupholder temperature control system comprising:
   a sensor for detecting an object within a cupholder;
   a temperature sensor for detecting a current object temperature of the object;
   an optical sensor for detecting a quick response (QR) code on the object in response to a detection of the object within the cupholder;
   a processor in operable communication with the sensor, the optical sensor, and the temperature sensor and configured to estimate a type of object and a contents of the object in response to the current object temperature and the QR code, retrieve a heating instruction in response to the contents of the object and generate a control signal in response to the current object temperature and the heating instruction; and a heat transfer system in operable communication with the processor and configured to perform a heating function on the object in response to the control signal.

2. The cupholder temperature control system of claim 1, wherein the type of object includes at least one of a can and a cup.

3. The cupholder temperature control system of claim 1, wherein the heating instruction includes a temperature value associated with the contents of the object.

4. The cupholder temperature control system of claim 1 wherein the wherein the contents of the object are estimated to be a coffee from a coffee shop and wherein the heating instruction includes a warming temperature associated with a coffee from the coffee shop.

5. The cupholder temperature control system of claim 1 further including a pressure sensor and wherein the heat transfer system is activated in response an output of the pressure sensor corresponding to a weight of the object exceeding a threshold value.

6. The cupholder temperature control system of claim 1 further including a pressure sensor situated within the cupholder and wherein a presence of the object is determined in response to a change in pressure detected by the pressure sensor.

7. The cupholder temperature control system of claim 1 wherein an initial temperature setting of the heat transfer system is determined in response to the current object temperature.

8. The cupholder temperature control system of claim 1 wherein an initial temperature setting of the heat transfer system is determined in response to a prior user defined temperature associated with the object.

9. The cupholder temperature control system of claim 1 wherein the heat transfer system is activated in response to the current object temperature differing from an ambient temperature by a threshold temperature value.

10. A method for controlling a cupholder temperature control system comprising:

detecting an object within a cupholder;

determining a current temperature of the object;

detecting, by an optical sensor, a quick response (QR) code on the object in response to a detection of the object within the cupholder;

estimating a type of object and a contents of the object in response to the current temperature of the object and the QR code;

retrieving a heating instruction in response to the contents of the object;

generating a control signal in response to the current temperature of the object and the heating instruction; and activating a heat transfer system to perform a heating function on the object within the cupholder in response to the control signal.

11. The method for controlling the cupholder temperature control system of claim 10 wherein the optical sensor is a camera and wherein a processor performs an image recognition algorithm to determine the object is the beverage container and wherein the type of object includes at least one of a can and a cup and wherein.

12. The method for controlling the cupholder temperature control system of claim 10 wherein a determination that the object is the beverage container is performed in response to the current temperature of the object exceeding a threshold difference from an ambient temperature within a vehicle cabin.

13. The method for controlling the cupholder temperature control system of claim 10 wherein a determination that the object is the beverage container is performed in response to the current temperature of the object exceeding a threshold difference from an ambient temperature outside of a vehicle including the cupholder.

14. The method for controlling the cupholder temperature control system of claim 10 wherein the object is detected within the cupholder in response to a change in an output value of a pressure sensor situated within the cupholder.

15. The method for controlling the cupholder temperature control system of claim 10 including generating a user interface in response to generating the control signal, receiving a user input corresponding to a temperature and controlling the heat transfer system in response to the temperature.

16. The method for controlling the cupholder temperature control system of claim 10 including generating a user interface in response to generating the control signal, receiving a user input corresponding to a temperature, controlling the heat transfer system in response to the temperature and storing the temperature and an indication of the beverage container in a memory wherein the temperature is used as a default temperature for the heat transfer system in response to a detection of the beverage container within the cupholder.

17. The method for controlling the cupholder temperature control system of claim 10 wherein the object is determined to be the beverage container in response to at least one of a logo, a bar code, and the quick response code on the beverage container.

18. The method for controlling the cupholder temperature control system of claim 10 wherein the heating instruction includes a temperature value associated with the contents of the object and wherein the contents of the object are estimated to be a coffee from a coffee shop and wherein the heating instruction includes a warming temperature associated with a coffee from the coffee shop.

19. A cupholder temperature control system comprising;

a pressure sensor for detecting an object within a cupholder;

a temperature sensor for detecting a current object temperature of the object;

an optical sensor for capturing an image of the object;

a processor in operable communication with the pressure sensor, the optical sensor, and the temperature sensor, the processor configured to perform an image recognition algorithm to detect a quick response (QR) code on the object, to determine the object is a beverage container in response to a detection of the quick response code, to estimate a contents of the object in response to the current object temperature and the QR code, retrieve a heating instruction in response to the contents of the object, to generate a control signal in response to the current object temperature differing from an ambient temperature by a threshold amount m the heating instructions, and the object being a beverage container; and a heat transfer system in operable communication with the processor and configured to perform a heating function on the object to maintain the current object temperature of the object in response to the control signal.

20. The cupholder temperature control system of claim 19 further including a user interface for providing an indication of an activation of the heat transfer system, for receiving a user input indicative of an alternate temperature and wherein the heat transfer system is further configured to operate at the alternate temperature in response to the user input.

\* \* \* \* \*